United States Patent

Niderost

[11] Patent Number: 6,089,293
[45] Date of Patent: *Jul. 18, 2000

[54] TIRE CONTAINING REINFORCEMENT PLY WITH PARALLEL EXTENSIBLE REINFORCING MEMBERS AND METHOD OF MANUFACTURE

[75] Inventor: Kevin John Niderost, Henley-in-Arden, United Kingdom

[73] Assignee: Sumitomo Rubber Industries Ltd., Hyogo-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/804,754

[22] Filed: Feb. 24, 1997

[30] Foreign Application Priority Data

Feb. 24, 1996 [GB] United Kingdom .................. 9603948

[51] Int. Cl.⁷ ............................. B29D 30/70; B60C 9/18; B60C 9/22; D07B 1/06
[52] U.S. Cl. ............................. 152/527; 57/206; 57/311; 57/902; 152/451; 152/526; 152/531; 152/533; 156/117; 156/124
[58] Field of Search ............ 57/902, 206, 259–260, 57/311; 428/212, 292.1, 295.1, 295.4, 295.7, 379, 364, 36.9, 36.8, 36.92, 114; 152/451, 527, 556, 531, 533, 526, 536; 156/117, 124

[56] References Cited

U.S. PATENT DOCUMENTS

| | | | |
|---|---|---|---|
| 4,045,990 | 9/1977 | Klein . | |
| 4,219,601 | 8/1980 | Inoue et al. | 152/527 X |
| 4,333,306 | 6/1982 | Yamashita et al. | 57/206 |
| 4,718,470 | 1/1988 | Kusakabe et al. | 57/902 X |
| 4,981,542 | 1/1991 | Carrier | 152/533 X |
| 5,032,198 | 7/1991 | Kojima et al. | 152/531 X |
| 5,135,039 | 8/1992 | Mizuta et al. . | |
| 5,209,794 | 5/1993 | Nakasaki | 152/531 X |
| 5,213,642 | 5/1993 | Sponagel | 152/533 X |
| 5,213,652 | 5/1993 | Katoh et al. | 57/902 X |
| 5,271,445 | 12/1993 | Kohno et al. | 152/526 X |
| 5,287,691 | 3/1994 | Okamoto et al. | 57/529 |
| 5,293,737 | 3/1994 | Kabayashi et al. | 57/902 X |
| 5,295,346 | 3/1994 | Bundo et al. | 57/902 X |
| 5,505,243 | 4/1996 | Imamiya et al. | 57/902 X |
| 5,524,687 | 6/1996 | Poque et al. | 152/527 |
| 5,975,417 | 8/1998 | Damke et al. | 152/533 X |

FOREIGN PATENT DOCUMENTS

| | | |
|---|---|---|
| 2 056478 | 5/1971 | France . |
| 4209818A1 | 9/1993 | Germany . |
| 4334650C1 | 3/1995 | Germany . |
| 3-176205 | 7/1991 | Japan ..................................... 152/527 |
| 6-255310 | 9/1994 | Japan ..................................... 152/531 |
| 20099270 | 6/1975 | United Kingdom . |

OTHER PUBLICATIONS abstract of DE 42 09 818 cited by applicant, Sep. 30, 1993.

*Primary Examiner*—Adrienne C. Johnstone
*Attorney, Agent, or Firm*—Birch, Stewart, Kolasch & Birch, LLP

[57] ABSTRACT

A reinforcement ply for an elastomeric article comprises a plurality of parallel extensible reinforcing members laid at a substantially constant end count perpendicular to their longitudinal direction, the ply having different extensibilities in the longitudinal direction of the reinforcing members in different parts of the ply. The reinforcing members are preferably made such that they each have at least one filament which is displaced perpendicularly from the longitudinal centerline of the reinforcing member in one part of the reinforcing member compared to another part. A tire may include the reinforcement ply as a hoop or band in the ground contacting tread region.

14 Claims, 3 Drawing Sheets

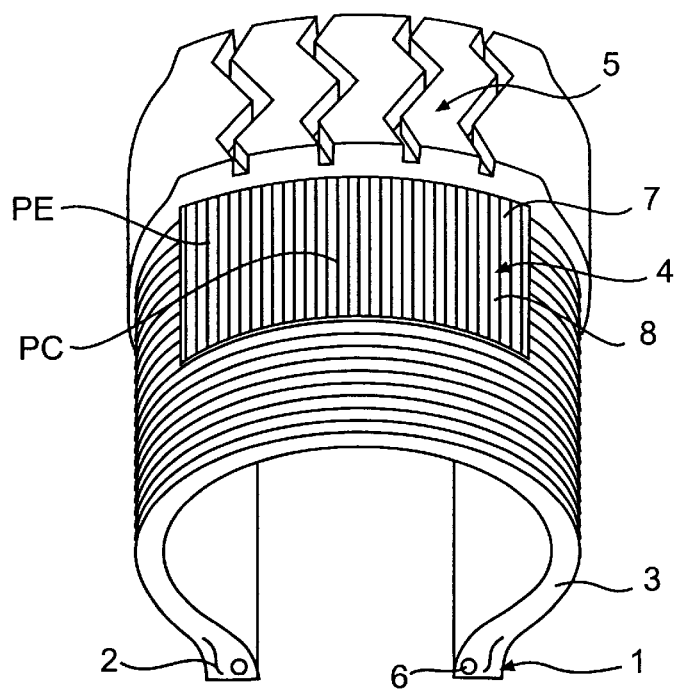
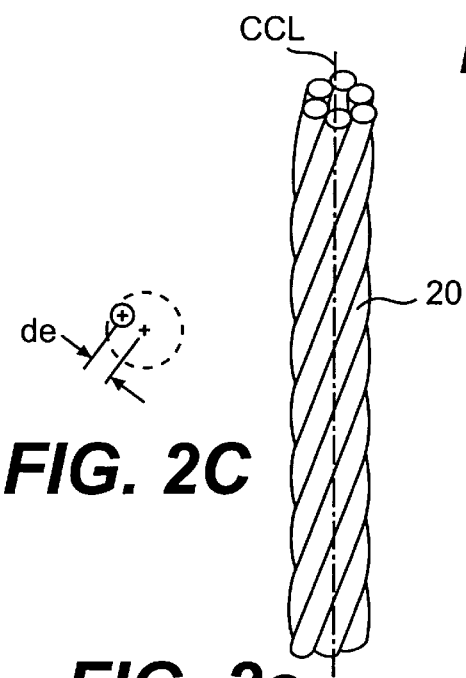
FIG. 2C
FIG. 2a
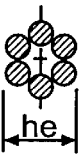
FIG. 2b
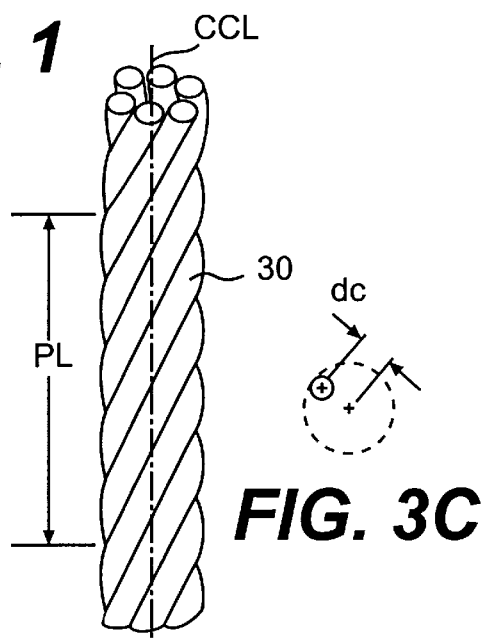
FIG. 3C
FIG. 3a
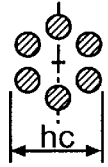
FIG. 3b

TIRE CONTAINING REINFORCEMENT PLY WITH PARALLEL EXTENSIBLE REINFORCING MEMBERS AND METHOD OF MANUFACTURE

BACKGROUND OF THE INVENTION

The present invention relates to a reinforcement ply or fabric for elastomeric articles such as hoses, belts, pneumatic actuators, diaphragms or springs, conveyors and tires or any product which similarly relies on continuous reinforcing members for its structural performance. The present invention is particularly applicable to the structure and manufacture of breaker and bandage plies which reinforce the ground contacting tread of a tire.

The reinforcing plies commonly used in elastomeric products comprise a plurality of reinforcing members in the form of fibers, filaments or cords livid parallel to each other along the length of the ply and embedded in an elastomeric material such as a rubber compound. In the ply fabric all of the reinforcing members are identical to each other and the use of grooved spacing rollers and an accurately controlled calender ensures that they are equally spaced within a precise thickness of elastomeric matrix. Thus the ply is produced having uniform construction and reinforcing ability across its entire axial width.

Elastomeric articles in general, and tires in particular, may suffer from problems associated with changes of shape occurring either in the process of manufacture and/or in subsequent use. These changes in shape can lead to differential strains in the reinforcing plies incorporated therein which can have a detrimental effect on the structural integrity and performance of the product.

Tires, for example, are subject to changes in shape during manufacture and subsequently in service. Firstly in the assembly of the 'green' or uncured tire, the reinforced carcass structure is changed from a cylinder to a toroid. Two subsequent changes which affect the tread reinforcing breaker occur first when the green tire is expanded into the mold prior to vulcanization and second when the finished tire is fitted to the wheelrim and inflated to its working pressure. Both of these situations change the shape of the initially cylindrical assembly of plies which form the breaker Accordingly differential strains are introduced into the breaker.

Further changes to the tire breaker occur under high speed running when the breaker belt edges tend to lift under the influence of centrifugal force. These further differential strains lead to a breakdown of the bond between the steel cords and the rubber matrix leading to so-called 'breaker-edge looseness' which is a common cause of premature tire failure. Many high speed tire constructions attempt to mitigate this belt edge lifting problem by wrapping the breaker belt assembly with a further bandage ply of cords arranged parallel to the circumferential direction of the tire. There have been many proposals for multiple edge windings and/or different materials at the edge of such bandage pliers to provide extra reinforcement over the region of the belt edge. However, all of these proposals involve the use of extra material or an extra manufacturing step which add to the difficulty and expense of manufacture.

Accordingly there is a clear need in such elastomeric articles for a reinforcing ply which can provide different extensibility and thus different reinforcement in different parts within a single ply such that the ply may accommodate changes in shape without generating extreme differential stresses.

SUMMARY OF THE INVENTION

It is therefore an object of the present invention to provide a reinforcing ply structure, and a method of manufacturing such a ply, which permits a variation in the reinforcing ability in different parts of the ply so that the reinforcement profile can be tailored to the particular product.

According to one aspect of the present invention a reinforcement ply for an elastomeric article comprises ii plurality of parallel extensible reinforcing members laid at a substantially constant end count perpendicular to their longitudinal direction, characterized in that the ply has different extensibilities in the longitudinal direction of the reinforcing members in different parts of the ply.

The reinforcing members are preferably made from a single cord. By a single cord is meant a base stock cord is used comprising a given construction which is used for all the reinforcing members.

As will be appreciated in order to get different extensibilities such a single cord needs to have varying material properties and/or varying geometry.

The reinforcement members preferably comprise at least one filament which is displaced perpendicularly from the longitudinal centerline of the reinforcing member in one part of the reinforcing member compared to another part.

The displacement of the filament laterally or perpendicular to the longitudinal direction may be in the form of a helix having different helical diameters or different helical pitches in different parts of the ply. The filament may alternatively or additionally be kinked and have a different degree of kinking in different parts of the ply. The filament may be a steel filament.

The elastomeric article may be a tire and the reinforcing ply may be disposed as a hoop or band in the ground contacting tread region.

According to another aspect of the present invention a method of making a reinforcement ply for an elastomeric article comprises a plurality of parallel extensible reinforcing members wherein the ply has different extensibilities in the longitudinal direction of the reinforcing members in different parts of the ply and is characterized by displacing a filament of the reinforcing member perpendicularly from the longitudinal centerline of the reinforcing member in at least one part of the reinforcing member compared to another part thereof.

By varying the amount or degree of perpendicular or lateral displacement of a filament of the ply member a ply can then be made which has different extensibilities and thus different reinforcing ability in different parts of the ply.

The change in extensibility may be continuous and progressive across the ply.

BRIEF DESCRIPTION OF THE DRAWINGS

Further aspects of the invention will become apparent from the following description when viewed in conjunction with the following drawings, wherein:

FIG. 1 is a schematic diagram showing a tire tread region comprising a reinforcing ply according to the present invention;

FIGS. 2a–2c are schematic diagrams showing details of the ply member construction in the ply edge area PE of FIG. 1;

FIGS. 3a–3c are schematic diagrams showing details of the ply member construction in the ply center area PC of FIG. 1;

DETAILED DESCRIPTION OF THE INVENTION

Figure 4:
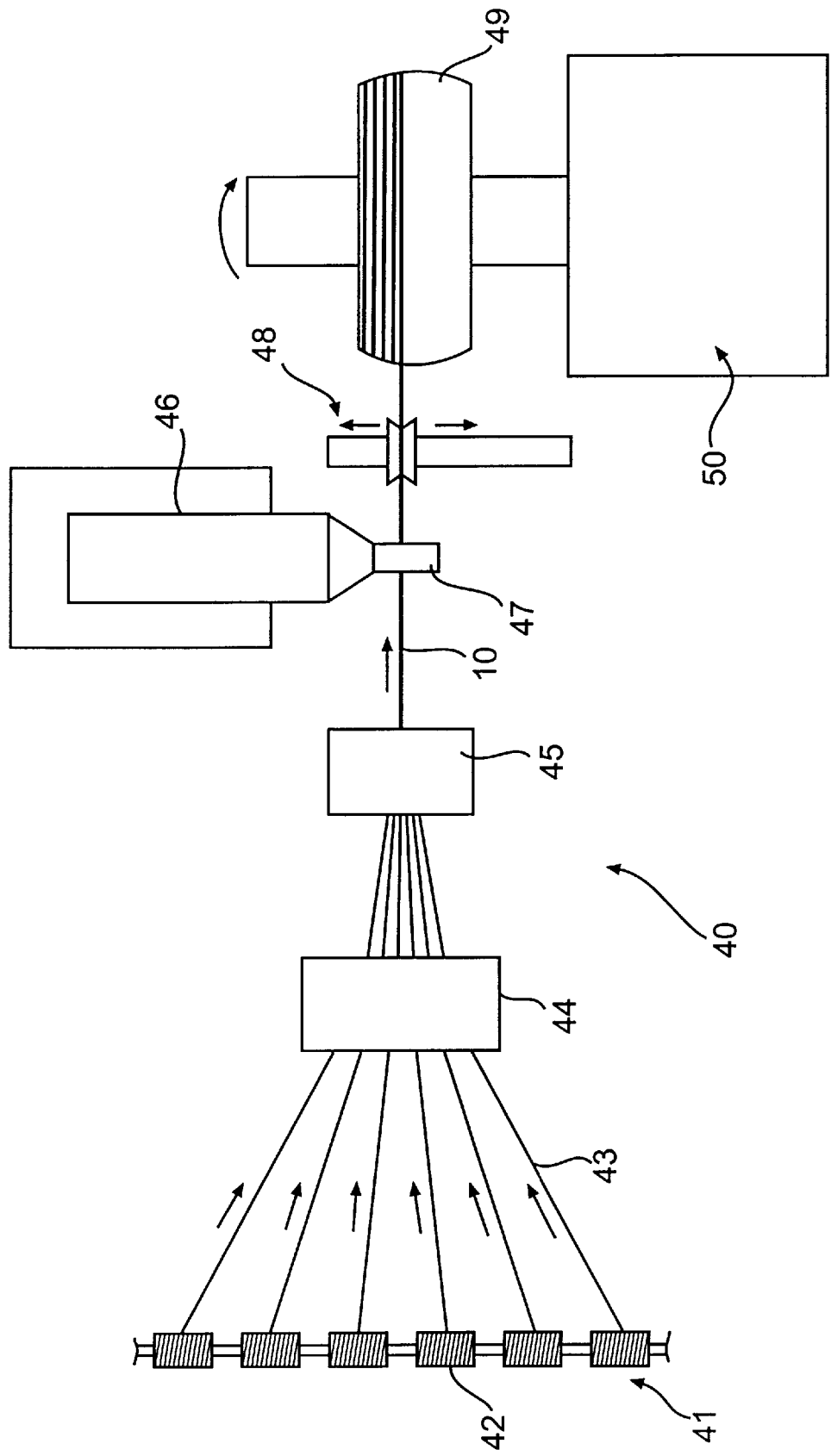
FIG. 4 is a schematic diagram showing the manufacture of the ply of FIG. 1.

Shown in FIG. 1 is a cut-away part-section of a molded pneumatic tire. The tire has a tire carcass 3 extending between two bead regions 1 and passing through a ground contacting tread region 5. The tire carcass 3 is reinforced by a carcass ply comprising radially extending rubber covered reinforcing members or cords which are anchored in each bead region 1 around a circumferentially extending bead hoop or core 6. Each bead region 1 is further reinforced by a filler ply 2.

In the tread region 5 the tire is further reinforced by a belt or breaker 4. This may comprise one or more reinforcing plies comprising a layer 8 of rubber covered reinforcing members or cords 7 laid parallel to each other. The cords may be inclined with respect to the circumferential direction of the tire or they may be substantially parallel to the circumferential direction as shown in FIG. 1.

According to the present invention the ply 4 is provided with different reinforcing ability in different regions across its axial width by means of the cords 7 having different extensibilities in the different parts thereof.

As shown in FIGS. 2 and 3 the cords 7 of the ply 4 comprises six steel filaments or wires 20,30 cabled together, such that each filament adopts a helical shape in the cord. Accordingly each filament of the cord is laterally deformed or displaced perpendicular to the longitudinal direction of the reinforcing member, i.e. the direction of the cord centerline CCL.

FIGS. 2b and 3b show cross-sections of the cords of FIGS. 2a and 3a in the directions of arrows A—A and B—B respectively. FIGS. 2c and 3c show details of the displacements de and dc of the wires 20,30 respectively from the longitudinal centerlines CCL of the cords.

According to the present invention different regions of the ply 4 are provided with different extensibilities by virtue of variations in the degree or amount of lateral or perpendicular displacement of the filament or filaments of the reinforcing cord. Thus as can be seen from FIGS. 2 and 3 cords in the ply edge region PE have a smaller helical diameter he than the helical diameter hc of the cords in the ply center region PC. Accordingly the cords in the ply edge region PE have a smaller filament displacement or deformation de than the filament displacement dc of cords in the ply center region PC. Accordingly the cords in the ply central region PC are more extensible than the cords in thee ply edge region and therefore the ply provides greater reinforcement at the tread edge than in the tread center.

Alternatively or in addition to having different helical diameters the cords may have different helical pitch or 'lay' lengths PL in different parts of the ply.

Shown in FIG. 4 is a schematic layout of an apparatus 40 for forming the ply of FIG. 1. The apparatus comprises a filament let-off unit 41 holding a plurality of spools 42 of filaments 43. From the let-off unit 41 the filaments 43 pass through a preformer unit 44 in which some or all of the filaments 43 may be preformed and/or twisted as desired. The filaments next pass to a cabling unit 45 in which the filaments are twisted together to form a cord 10. From the cabling unit the cord 10 passes through a cross-head die 47 of a rubber extruder 46 which coats the cord with uncured rubber. The rubbered cord then passes over a transversely movable roller 48 which guides the cord onto the outer surface of a rotating tire carcass 49 mounted on a tire building machine 50. The transversely movable roller 48 is moved slowly to guide the cord to form a spirally wound ply over substantially the entire radially outer peripheral portions of the tire carcass.

Figure 6:
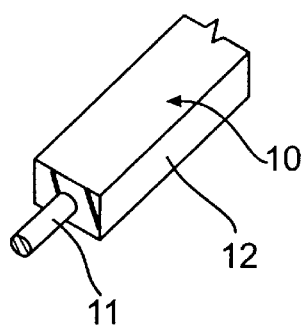
FIGS. 6 and 7 are schematic diagrams showing alternative tire tread reinforcing ply constructions according to the present invention.
Figure 7:
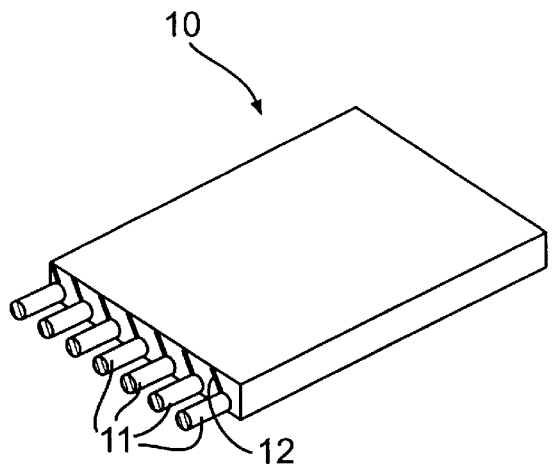

While the above apparatus describes the formation of a rubbered cord 10 comprising, as shown in FIG. 6 a single cord 11 embedded in rubber 12, a plurality of such cords may be formed into a narrow ribbon or tape as shown in FIG. 7 for winding onto the tire carcass.

The rubbered cord or tape of cords may be formed on the tire carcass with adjacent windings either overlapping, side-by-side or spaced apart slightly thus providing plies with different cord density.

The amount of lateral displacement of one or more filaments in the cord may be varied by varying either or both of the preforming or cabling conditions in the respective units 44 and 45. Varying the lateral displacement gradually and continuously makes possible the formation of a ply on the tire carcass 49 having different extensibilities in different regions laterally across the ply.

For example the breaker ply 8 of FIG. 1 may be formed by cabling the filaments tightly initially, in the cords forming the ply edge region PE and then gradually and continuously cabling them more loosely as the winding progresses towards the axially central part PC of the tire carcass. Thereafter the filaments of the cord are gradually and continuously cabled more tightly as winding proceeds from the central part PC towards the other edge portion. In this way the breaker ply 8 is formed having greater extensibility in the central portion PC than the edge portions PE, with the transition between the two occurring continuously and uniformly across the axial width of the ply.

Figure 5:
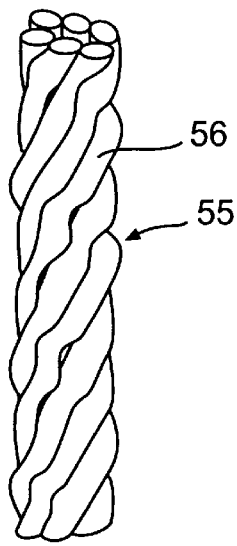
FIG. 5 is a schematic diagram of another construction of ply reinforcing member according to the present invention.

Alternatively or additionally variations in lateral displacement may be obtained by varying the degree of preforming of one or more filaments. Commonly in forming the helically wound cords of FIGS. 2 and 3 the filaments are preformed by passage around a cylindrical roller. In the alternative ply reinforcing cord 55 shown in FIG. 5, one or more filaments 56 are kinked prior to cabling by passage over a polygonal roller. In such a cord the degree of lateral displacement may be varied by varying the number of kinked filaments and/or the degree of kinking, either by varying the diameter of the polygonal preforming roller or by changing the number of polygonal faces.

Figure 8:
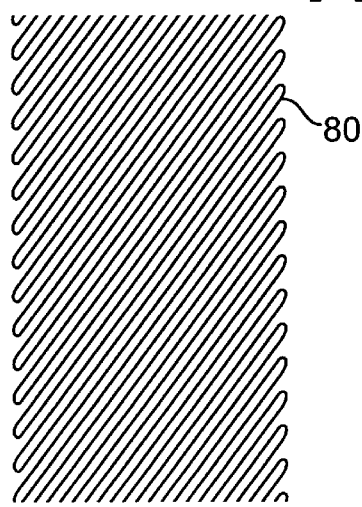
FIGS. 8 and 9 are schematic diagrams showing a single rubberized reinforcing member and a plurality of reinforcing members rubberized to form a narrow tape.
Figure 9:
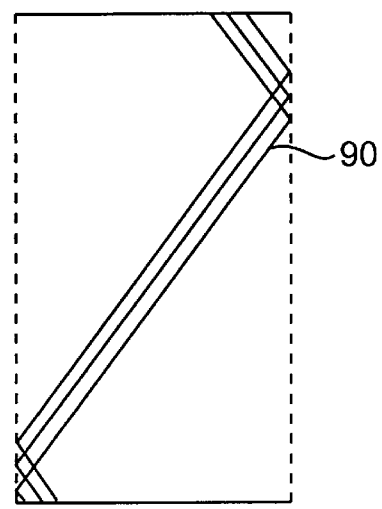

The present invention is also not limited to plies formed by spiral or helical wound cords and may by applied to plies having a cord 80,90 or cords wound at acute angles between the ply edges such as shown in FIGS. 8 and 9. However as will be appreciated, in such alternative plies the changes in lateral deformation of the filaments have by necessity to be more rapid and more frequent in order to produce a ply having the desired different extensibility in different axial parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tire containing a reinforcement ply in a ground-contacting tread region of the tire in the form of a hoop or band, the reinforcement ply comprising a plurality of continuous helical windings across the axial width of the ply of at least one reinforcing member, each reinforcing member comprising at least one filament, the helical windings being substantially parallel to the circumferential direction of the tire and laid at a substantially constant end count perpendicular to their longitudinal direction, wherein the extensibility of the at least one reinforcing member in the longitudinal direction thereof increases continuously across the axial width of the ply from the axially outer edges to the axial center of the ply by displacement of the at least one filament in each reinforcing member perpendicularly or laterally from the longitudinal centerline (CCL) of the reinforcing member.

2. The tire of claim 1, wherein the reinforcing members are made from a single cord.

3. The tire of claim 1, wherein the at least one filament is displaced in a helix having different helical diameters in different parts of the ply.

4. The tire of claim 1, wherein the at least one filament is deformed in a helix having different helical pitches in different parts of the ply.

5. The tire of claim 1, wherein the at least one filament is kinked.

6. The tire of claim 5, wherein the at least one filament is alternatively or additionally kinked and has a different degree of kinking in different parts of the ply.

7. The tire of claim 1, wherein the at least one filament is steel.

8. In a method of making a tire the improvement comprising providing a reinforcement ply in a ground-contacting tread region of the tire in the form of a hoop or brand the reinforcement ply containing a plurality of continuous helical windings across the axial width of the ply of at least one reinforcing member, each reinforcing member comprising at least one filament, the helical windings being substantially parallel to the circumferential direction of the tire and laid at a substantially constant end count perpendicular to their longitudinal direction, wherein the extensibility of the at least one reinforcing member in the longitudinal direction thereof increases continuously across the axial width of the ply from the axially outer edges to the axial center of the ply by displacing the at least one filament in each reinforcing member perpendicularly or laterally from the longitudinal centerline (CCL) of the reinforcing member.

9. The method of claim 8, which comprises helically displacing the at least one filament and varying the helical diameter thereof.

10. The method of claim 8, which comprises helically displacing the at least one filament and varying the helical pitch thereof.

11. The method of claim 8, which comprises kinking the at least one filament and varying the degree of kinking thereof.

12. The method of claim 8, which comprises providing the continuous sequence of laterally deforming at least one filament, forming each reinforcing member of said at least one deformed filament and forming said reinforcement ply as a band or hoop.

13. The method of claim 12, wherein between forming each reinforcing member and forming the band or hoop each reinforcing member is coated with a vulcanizable rubber material.

14. The method of claim 13, wherein said at least one reinforcing member is several reinforcing members which are brought into close linear proximity and coated with a vulcanizalbe rubber material to form a narrow tape.

* * * * *